US007274931B2

(12) United States Patent
Harris

(10) Patent No.: US 7,274,931 B2
(45) Date of Patent: Sep. 25, 2007

(54) SYSTEMS AND METHODS FOR ENHANCING THE PROVISIONING AND FUNCTIONALITY OF WIRELESS INSTRUMENTS

(76) Inventor: Arlene J. Harris, 2704 Ocean Front, Del Mar, CA (US) 92104

( * ) Notice: Subject to any disclaimer, the term of this patent is extended or adjusted under 35 U.S.C. 154(b) by 0 days.

(21) Appl. No.: 11/064,715

(22) Filed: Feb. 22, 2005

(65) Prior Publication Data

US 2005/0186953 A1 Aug. 25, 2005

Related U.S. Application Data

(60) Provisional application No. 60/547,569, filed on Feb. 23, 2004.

(51) Int. Cl.
*H04M 3/00* (2006.01)

(52) U.S. Cl. .................. 455/419; 455/550.1; 455/13; 455/403; 455/414; 455/456; 455/566; 455/517; 455/522; 455/553; 455/556.1; 455/557; 455/127.1; 348/14.02

(58) Field of Classification Search ................ 455/517, 455/552, 553, 422, 556.1, 557, 550.1, 13, 455/403, 414, 456, 573, 566, 419
See application file for complete search history.

(56) References Cited

U.S. PATENT DOCUMENTS

| 5,689,825 | A | * | 11/1997 | Averbuch et al. | ............ 455/418 |
| 6,405,049 | B2 | * | 6/2002 | Herrod et al. | ............... 455/517 |
| 2003/0109994 | A1 | * | 6/2003 | Dubil et al. | .................. 702/63 |
| 2003/0125075 | A1 | * | 7/2003 | Klovborg | .................... 455/556 |

* cited by examiner

*Primary Examiner*—Joseph Feild
*Assistant Examiner*—Randy Peaches
(74) *Attorney, Agent, or Firm*—Straub & Pokotylo; Michael P. Straub

(57) ABSTRACT

A system and method for enhancing the provisioning and functionality of wireless or portable devices, and more particularly a charging device configured to bi-directionally communicate to a database through the Internet or a private network to configure, update, and provision a wireless portable device while charging the portable or wireless device. Additionally, a system and method for alerting a user that the portable or wireless device requires a programmable action.

40 Claims, 14 Drawing Sheets

SYSTEMS AND METHODS FOR ENHANCING THE PROVISIONING AND FUNCTIONALITY OF WIRELESS INSTRUMENTS

RELATED APPLICATIONS INFORMATION

This application claims the benefit under 35 U.S.C. § 119(e)(1) of the Provisional Application filed under 35 U.S.C. § 111(b) entitled, "SYSTEMS AND METHODS FOR ENHANCING THE PROVISIONING AND FUNCTIONALITY OF WIRELESS INSTRUMENTS," Ser. No. 60/547,569, filed on Feb. 23, 2004. The disclosure of the Provisional Application is incorporated in its entirety by reference herein.

BACKGROUND OF THE INVENTION

1. Field of the Invention

The field of the invention relates generally to enhancing the provisioning and functionality of wireless and/or portable devices, and more particularly is related to systems and methods of provisioning a wireless and/or portable device through the Internet or private network.

2. Background Information

Cellular telephones have proliferated in capabilities and features. Though most of the features are accessible through the cellular telephone's user interface, the complexity of features and reduction in size of cellular telephones makes it cumbersome for many users to program these features. Some cellular telephone manufacturers, as well as third party vendors provide docking equipment which enables a user to interface his cellular telephone to a computer in order to program these features. However, many of those users who have the most difficulty in programming their cellular telephone features are those users who are less likely to own a computer or more likely to lack the working knowledge necessary to operate many computer applications.

For example, a senior citizen may possess a cellular telephone for emergency use, to communicate with family members, or to defray the cost of long distance calls. A senior citizen may only desire to program the cellular telephone with a minimal number of telephone numbers, but the complexity required to program the cellular telephone and the decreasing size of the telephone can make it difficult for the user to program these numbers.

Cellular telephone users face another problem when replacing their telephone, which can be necessitated due to breakdown or loss. In such instances, the user programmable settings may be lost. While in some cases, a user may have a computer interface that can download these settings to, e.g., a replacement telephone, a large number of users have no mechanism for backing up user programmable settings. Even in the case where the user does have a computer interface, many users do not have the discipline to regularly back up these settings.

Further, most computer interfaces and software directed to programming settings for cellular telephones are limited to the extent of what can be programmed. Many solutions aimed at easing a cellular telephone's configuration allow the programming of only a subset of the features the cellular telephone is designed to be configured. Many other functions, including the provisioning of the cellular telephone, are not available to the user or are restricted to the cellular carriers and their designees.

SUMMARY OF THE INVENTION

In order to combat the above problems, the systems and methods described herein provide a charging device having a cradle configured to receive a portable device where the cradle is operably connected to a power source and configured to charge a battery in the portable device and an alarming mechanism configured to initiate an alarm based on a programmable action. The charger device can also have a programmable circuit configured to store and initiate said programmable actions and a user interface configured to enable the programming of said programmable actions into said programmable circuit.

In a further embodiment, the systems and methods described herein provide a charging device having a cradle configured to receive a portable device where the cradle is operably connected to a power source and configured to charge a battery in the portable device. The charging device also has a communication port operably configured for establishing a bi-directional communication connection with a network and a programmable circuit configured to transmit and receive data through the bi-directional communication connection established with the network. The data received from the network is downloaded to the portable device, and information stored in the portable device is uploaded to the network when the portable device is coupled to the cradle. The charging device can also have an alarming mechanism operably configured to initiate an alarm based on a programmable action.

In another embodiment, the systems and methods described herein provide a charging device having a power mechanism operably configured for connecting a portable device to a power source, where upon establishing said connection, the power source charges a battery in the portable device. The charging device also has a communication port, integrally coupled to the power mechanism and operably configured for establishing a bi-directional communication connection between said portable device and a network, wherein upon establishing the bi-directional communication connection, data is transmitted and received between the portable device and network such that data received from the network is downloaded to the portable device, and information stored in the portable device is uploaded to the network. The charger device can also have an alarming mechanism operably coupled to said power source and configured to initiate an alarm based on a programmable action.

Other aspects, advantages, and novel features of the invention will become apparent from the following Detailed Description of the Preferred Embodiments, when considered in conjunction with the accompanying drawings.

BRIEF DESCRIPTIONS OF THE DRAWINGS

Preferred embodiments of the present inventions taught herein are illustrated by way of example, and not by way of limitation, in the figures of the accompanying drawings, in which.

DETAILED DESCRIPTION OF THE PREFERRED EMBODIMENTS

Figure 1:
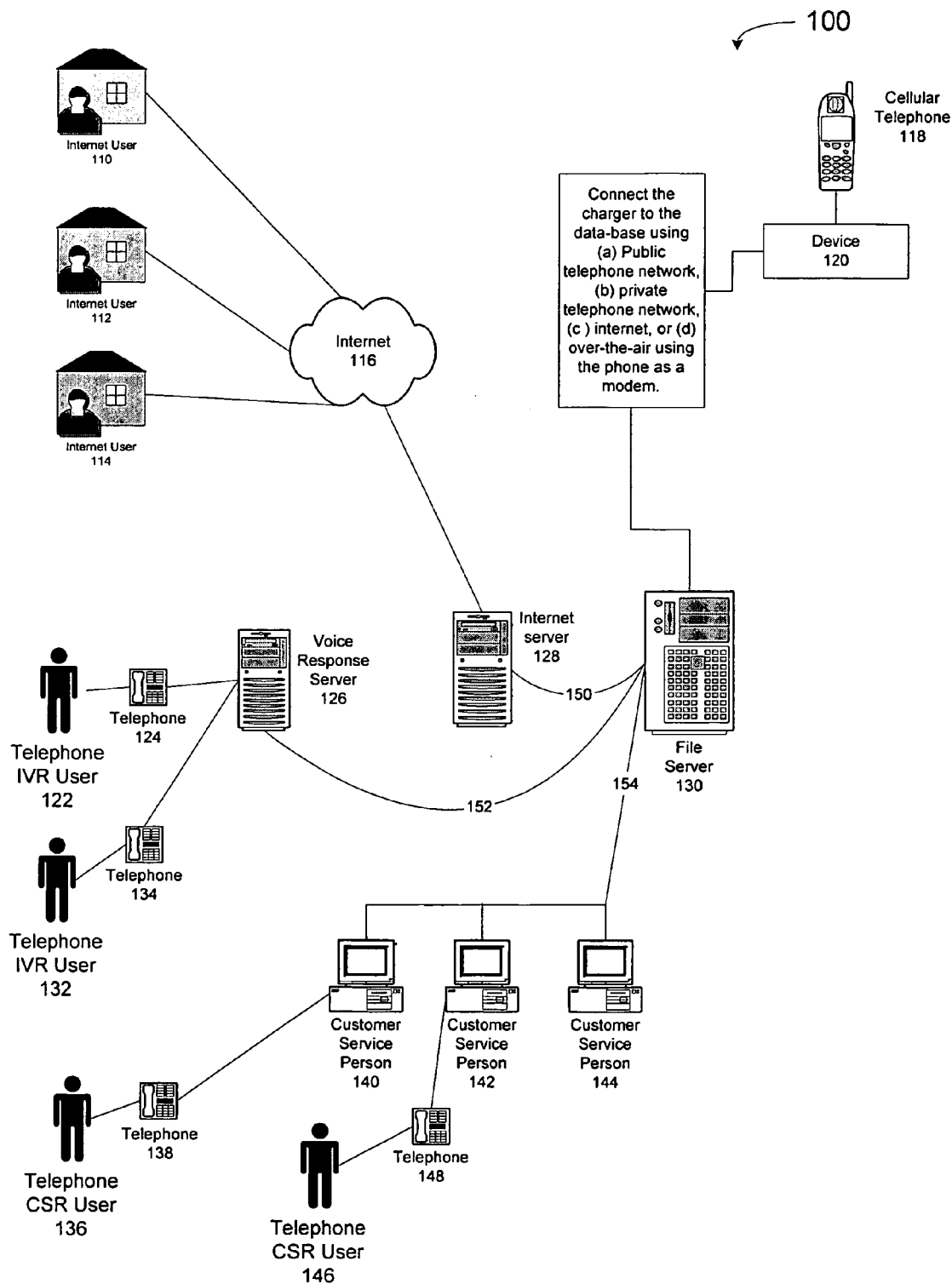
FIG. 1 shows an exemplary embodiment of a system for maintaining programmable settings within a cellular telephone.

In the descriptions of example embodiments that follow, implementation differences, or unique concerns, relating to different types of systems and methods described in terms of a cellular telephone will be pointed out to the extent possible. But it should be understood that the systems and methods described herein are applicable to any portable device requiring data exchange and requiring its batteries be charged, including other wireless or portable devices such as a Personal Digital Assistant (PDA) as well as a portable medical monitor or medical device, a cellular telephone, a digital camera, or a music player such as a portable MP3 player.

As described herein, a charger or charging device may refer to a synchronizing device equipped with bi-directional communications capabilities and the ability to charge a power source of a portable or wireless device. The bi-directional communication capabilities permit the charging device to transmit information, receive information, store information, and forward information between the portable or wireless device or the charging device and a database coupled to the Internet or a private network, e.g. a private company or government local area network or wide area network, or a combination of public and private networks. The charging device may be capable of numerous functionalities including but not limited to sending updates to the cellular telephone it is connected to, storing and forwarding information for programming the cellular telephone at a later time, and initializing and activating an un-programmed cellular telephone. The charging device can have local intelligence to perform programmable actions. The charging device can also be on a key fob which is equipped with the requisite communications capabilities but can lack a charging capabilities and operate on battery power. Though this disclosure describes the capabilities in terms of a charging devices, a fob with the same capabilities can be used in place of the charging device.

Depending on the context in which the term is used, as described herein, the user may be, but is not limited to a wireless device user, a cellular user, the charger user, or a third party manager of either the wireless device user or charger user.

As described herein, provisioning may refer to the process of setting up any programmable instrument, including any wireless internet device, or any programmable services that determine the functionality of that programmable instrument or service. Provisioning may also refer to the process of bidirectional communication to and with any programmable instrument to download and operate remote diagnostics to troubleshoot, repair, upgrade, or activate that programmable instrument.

By way of introduction, a cellular telephone can be placed in contact with a charging device for the natural requirement of charging the cellular telephone battery and for the purpose of updating the cellular telephone's programmable features. The information that can be used to update the cellular telephone's information is available on any proprietary database of a host computer, typically through a website. Users can update the database using a computer by uniquely logging on to the website, creating or accessing their personal data file for a specific telephone number or numbers, updating the information, and logging off the website.

In one embodiment of the provisioning of a cellular telephone, a user can connect the cellular telephone to a charging device that is connected to the Internet through traditional wired communication methods, initialize a call via the connecting wires by pushing a button on the charging device or cellular telephone, logging on to the database host computer, downloading the programmable information, and logging off. For example, a user may connect her cellular telephone to a charging device that is connected to the Internet. Upon connecting the cellular telephone, the charging device can log onto a ring tone database and download a selected ring tone into the memory of the cellular telephone and log off. The user can then disconnect the cellular telephone and listen to the new ring tone.

In another embodiment, a user can completely provision a cellular telephone by connecting a newly purchased cellular telephone to the charging device. In this embodiment, before or following the purchase a cellular telephone, the user can log on to a particular website using a computer terminal connected to the Internet and enter any desired information to be downloaded into the cellular telephone. First, the user can enter information to identify the cellular telephone, typically via the Electronic Serial Number (ESN) available on the cellular telephone or the packaging, enter desired information such as names and cellular telephone numbers or other data to download to the cellular telephone or device, and log off from the computer. The user can also subscribe to additional features that may be dormant in the memory of the cellular telephone. Upon subscription to the feature, the feature becomes enabled. An exemplary feature may be an application for instant messaging, web browsing, video streaming, video gaming, or other communication or entertainment application. Once the information is uploaded into the database, the user can place the cellular telephone in the charging device or plug in the data cable from the charging device to the cellular telephone and activate an information exchange process in which the data entered into the computer is downloaded to the cellular telephone. The data entered into the computer can be saved and used to provision any number of cellular telephones or wireless devices. If a user then misplaces the cellular telephone, the data stored in the memory of the cellular telephone is not lost. Information can be exchanged from the database to the cellular telephone and from the cellular telephone to the database in a two-way bi-directional exchange.

FIG. 1 shows an exemplary embodiment of a system 100 for maintaining programmable settings within a cellular telephone 118 in accordance with the systems and methods described herein. Central to the system is file server 130 which can store programmable settings of the cellular telephone 118 and possibly other services. A charging device 120 can be coupled to the file server through a variety of methods depending on the embodiment, some of which are described in more detail below. As shown in FIG. 1, charging device 120 can also function as a charger for cellular telephone 118. While the cellular telephone 118 is charging, its programmable settings can be updated or synchronized. These settings can be retrieved from file server 130 either at the time cellular telephone 118 is placed in the charging device 120 or at a time prior to the placement of cellular telephone 118 in the charging device 120.

The programmable settings are delivered to file server 130 in a number of ways. For example, the file server 130 can retrieve the settings from the cellular telephone 118 or synchronize the settings with cellular telephone 118. Alternatively Internet users 110, 112 and 114 can access file server 130 using their own computer through the Internet 116. In one embodiment, for example, Internet users 110, 112, and 114 can access the Internet through Internet server 128. In another embodiment, file server 130 can connect directly to the Internet and in effect can, in certain embodiments, perform the function of Internet server 128.

In one embodiment, users 110, 112, and 114 can program characteristics of cellular telephone. 118 using a web interface. The web interface may, for example, be customized to the specific type of cellular telephone 118 the user is programming.

In accessing the file server 130, a user may be asked to identify which cellular telephone's characteristic is to be programmed. Further, the user may be asked to present authorization to program a particular cellular telephone's characteristics. Users 110, 112, and 114 can be either the owner of the cellular telephone or an authorized designated party. For example, a cellular telephone user could designate family members with the authority to program the cellular telephone.

In certain embodiments, a user can access system 100 using an interactive voice response (IVR) system. For example, telephone interactive voice response users 122 and 132 can program characteristics using an interactive voice response system, whereby telephone IVR user 122 asks by the file server 130 to identify the cellular telephone to be programmed, present authorization, and program the characteristics of cellular telephone 118. Telephone IVR user 122 uses telephone 124 to call a specific telephone number associated with the programming service. The call is answered by a voice response server 126 which can be configured to prompt telephone IVR user 122 for certain input. IVR user 122 responds to the prompts, e.g. by pressing buttons on telephone 124 to generate a Dual Tone Multi-Frequency (DTMF) tone recognized by voice response server 126. For instance, a prompt can offer multiple options which can be selected by the pressing of keys such as "1" or "2" on the telephone 124.

Alternatively, the interactive voice response system can also be adapted with simple voice recognition so that telephone IVR user 122 can respond the voice response server 126 by simple voice commands such as audibly speaking the numbers "one" or "two." In some embodiments, voice response server 126 can be incorporated in the same hardware as the file server 130. In another embodiment voice response server 126 can be a separate piece of hardware coupled to a file server 130 by connection 152 which can be a local area network (LAN) connection, a wide area network (WAN) connection, the Internet, cellular/PCS or Wi/Fi, Bluetooth, or some other form of wireless or wired computer communication.

Other users can be customer service response (CSR) users such as CSR users 136 and 146. In order to offer users 136 and 146 more convenience, the system 100 can be equipped with a customer service response component. For example, CSR user 136 can use telephone 138 to call a specific number, which connects CSR user 136 to one of a number of customer service persons. Each customer service person communicates with the file server 130 through their own workstation 140, 142, and 144 respectively coupled to file server 130 by connection 154. Connection 154 can, for example, be a LAN, WAN, Internet, cellular/PCS or Wi/Fi, Bluetooth, or equivalent connection. CSR user 136 then directs customer service person 140, after proper authentication, as to what characteristics of the cellular telephone are to be programmed. The system 100 permits users of varying degrees of comfort with technology to direct the programming of their cellular telephone 118.

Figure 2:
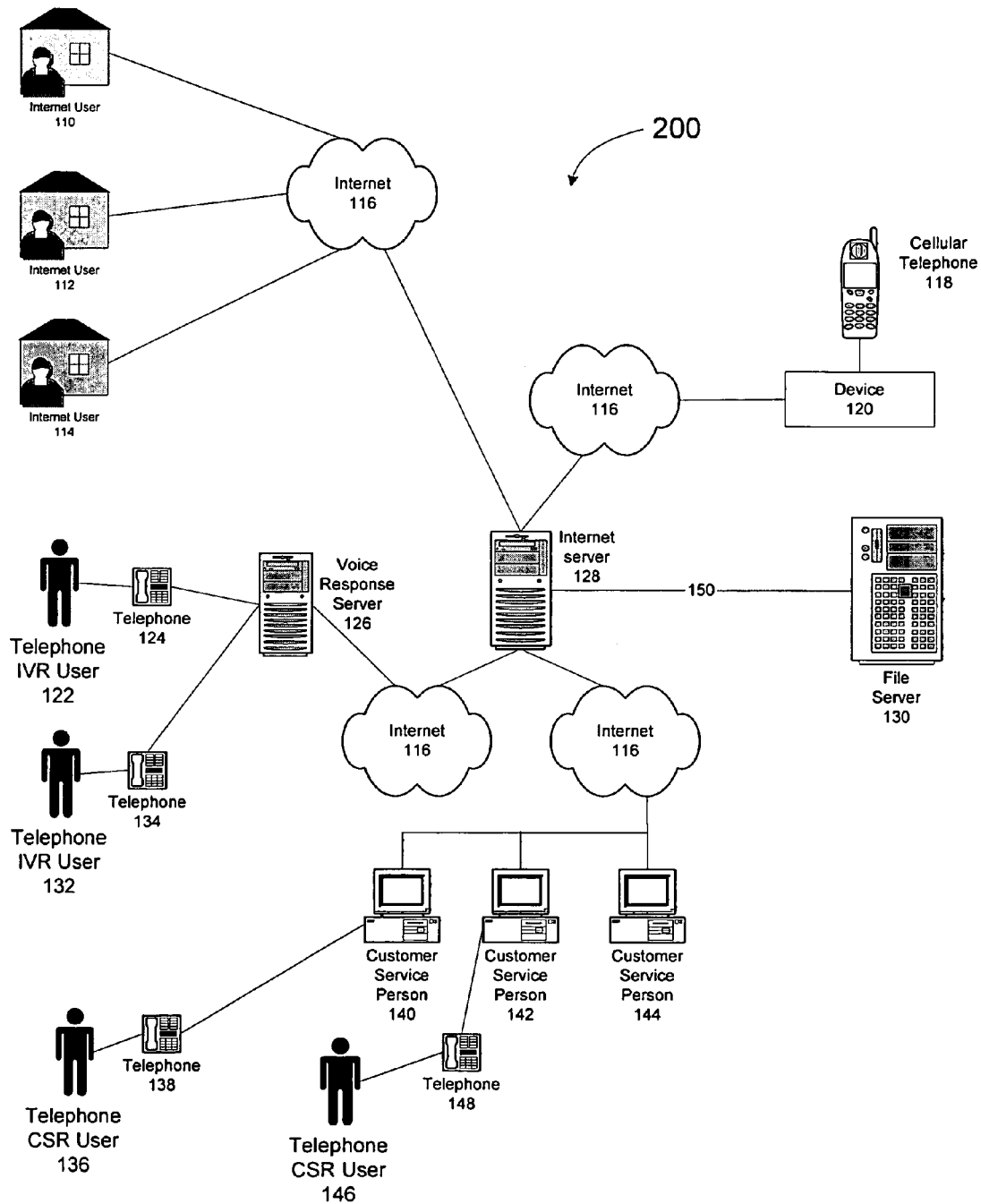
FIG. 2 shows an exemplary embodiment of a system for maintaining programmable settings within a cellular telephone whereby a charging device, customer service representatives, and a voice response server communicates with a file server through the Internet.

FIG. 2 shows an embodiment of a system 200 similar to that depicted in FIG. 1 where additionally, voice response server 126, customer service workstations 140, 142, and 144, and the charging device 120 can be coupled to the file server 130 through the Internet 116. In one embodiment, the charging device 120 and other components can be coupled to Internet server 128 through the Internet 116, which relays the communications to the file server 130 through a connection 150. Connection 150 can be either a LAN, WAN, cellular/PCS or Wi/Fi, Bluetooth or any other wired or wireless connection. A wired connection can be a DSL, cable, universal serial bus (USB), firewire, or other wired connection.

Figure 3:
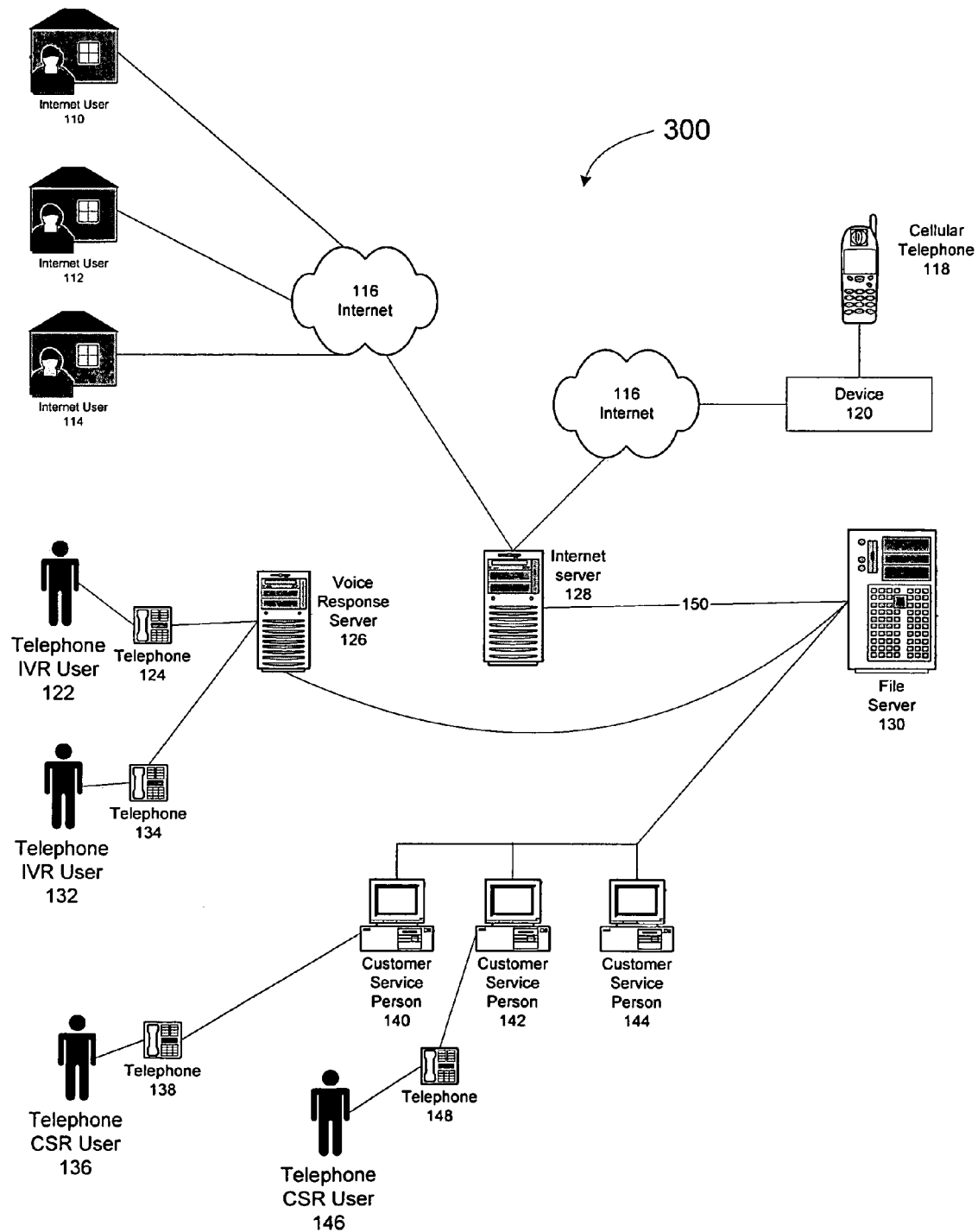
FIG. 3 shows an exemplary embodiment of a system for maintaining programmable settings within a cellular telephone whereby the charging device communicates with a file server through the Internet through an Internet server.

FIG. 3 shows an embodiment of a system 300 similar to that depicted in FIG. 1 where the charging device 120 is coupled to the file server 130 through the Internet 116. The charging device 120 can be connected to Internet server 128 through the Internet 116, which relays the communications to the file server 130 through connection 150. Connection 150 may be either a LAN, WAN, cellular/PCS or Wi/Fi, Bluetooth or any other wired or wireless connection. A wired connection can be a DSL connection, cable connection, USB, firewire or other wired connection.

Figure 4:
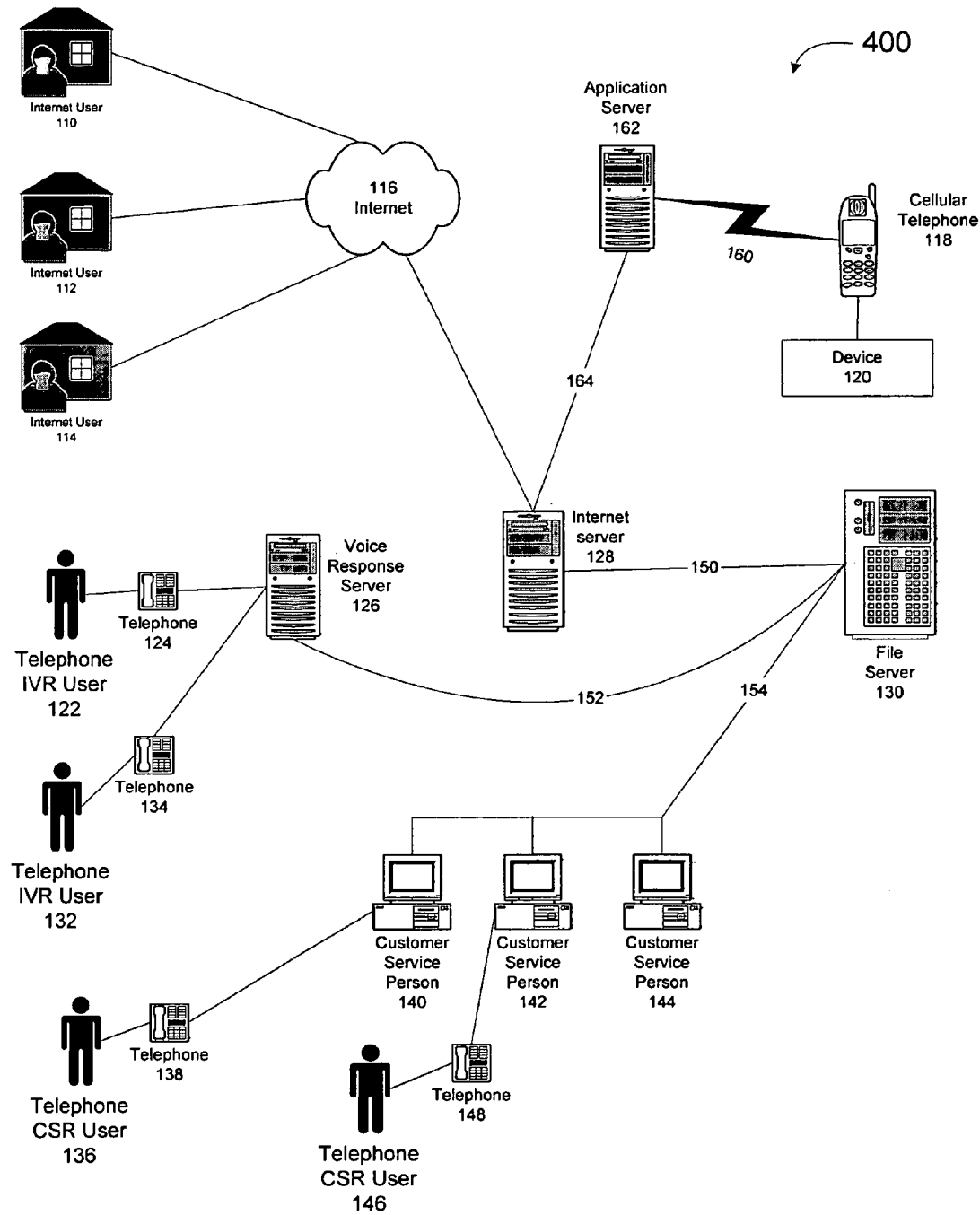
FIG. 4 shows an exemplary embodiment of a system for maintaining programmable settings within a cellular telephone whereby the charging device communicates using a cellular telephone connection established by the cellular telephone to an application server which is coupled to a file server.

FIG. 4 depicts an embodiment of the system 400 where the charging device 120 uses the cellular telephone 118 to establish a wireless telephone connection 160 to an application server 162 that can communicate with the file server 130. In this embodiment, the cellular telephone 118 calls the application server 160 which in turn is coupled to either Internet server 128 through a LAN, WAN, Internet or other connection 164. Alternatively, the cellular telephone 118 calls the application server 160 which in turn is coupled to a file server 130 with an integrated Internet server 128. This embodiment eliminates the need for the charging device 120 to be coupled to the file server 130 through a fixed Internet or standard telephone connection.

Figure 5:
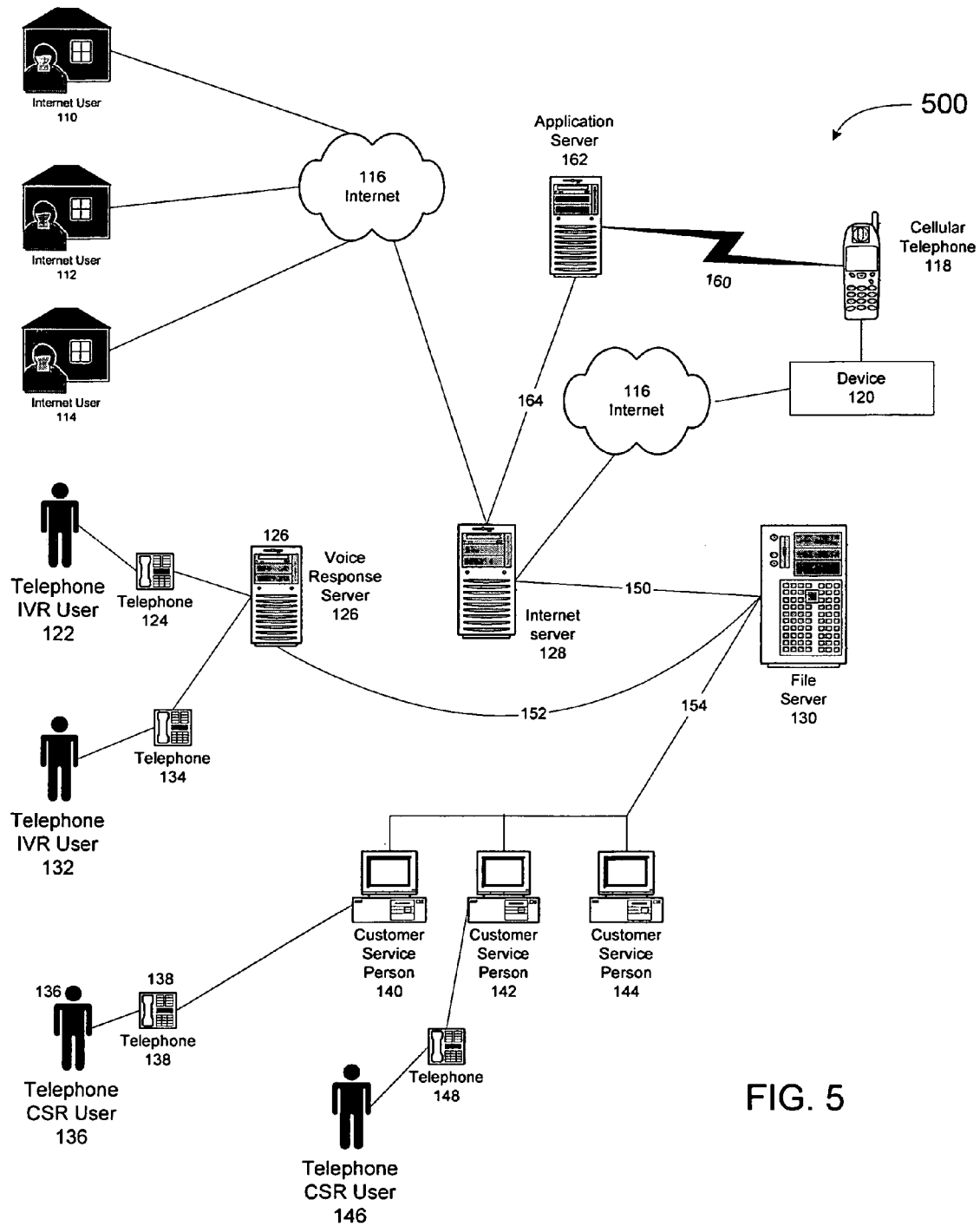
FIG. 5 shows an exemplary embodiment of a system for maintaining programmable settings within a cellular telephone whereby the charging device communicates to a file server through the Internet or over a cellular telephone connection through an application server.

FIG. 5 depicts another embodiment of the system 500 where the charging device 120 can communicate to file server 130 either through the Internet 116 as described in relation to FIG. 2 or through a wireless telephone connection 160 as described in relation to FIG. 4.

Figure 6:
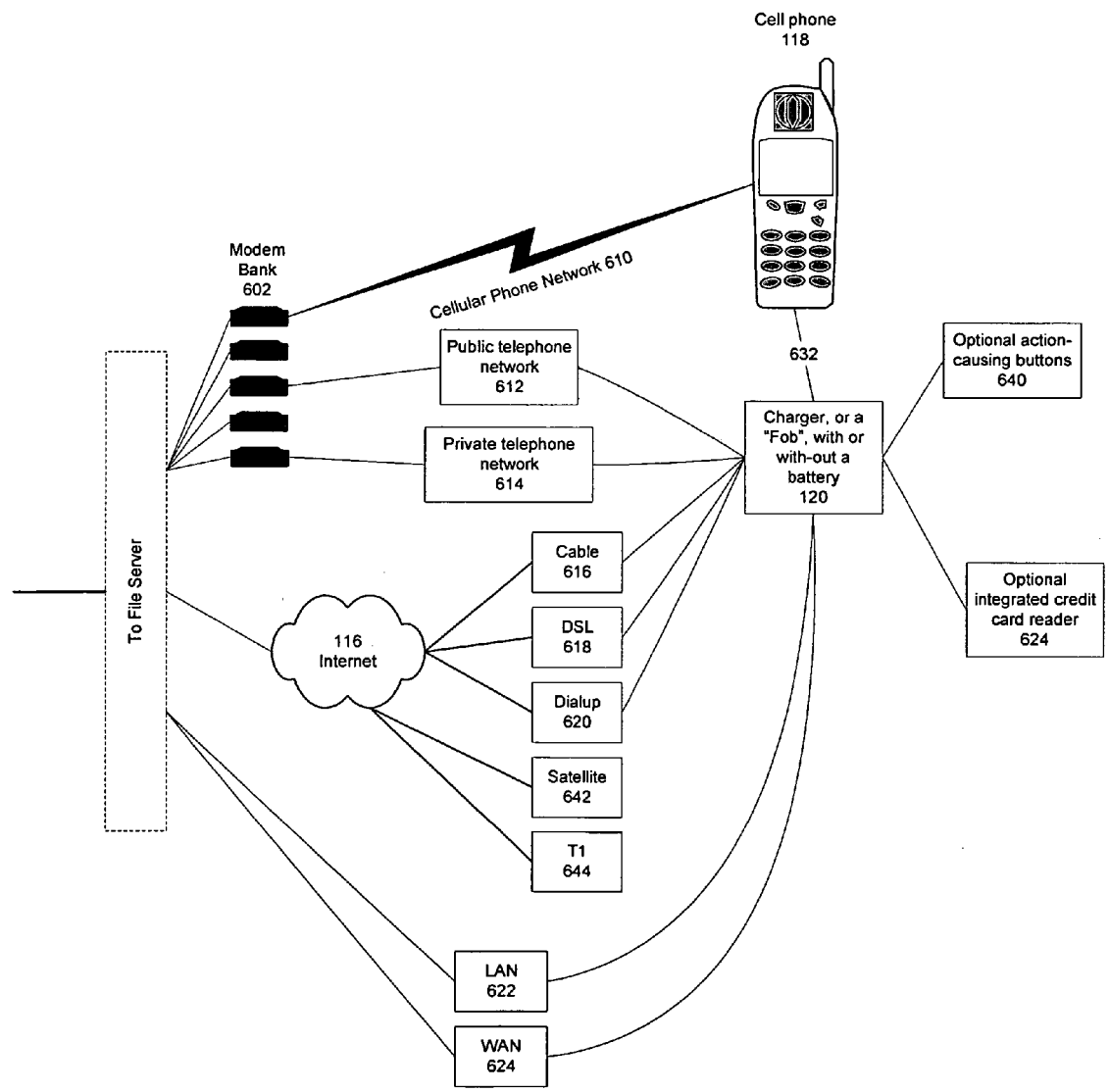
FIG. 6 shows a detailed exemplary embodiment of a system connecting a charging device, cellular telephone and optional peripherals to a file server.

FIG. 6 depicts various communication routes in which charging device 120, cellular telephone 118, and file server 130 can communicate. In one embodiment, charging device 120 can be connected to the Internet 116 through any connection such as a cable 616, a digital subscriber line (DSL) 618, a third party dialup access line 620, a satellite line 642 or a Ti digital transmission line 644. The charging device 120 can be coupled to the file server 130 through a LAN 622 or WAN 624. Alternatively, the charging device 120 can be coupled to the file server 130 through or any other wired or wireless connection. A wired connection can be a DSL connection, cable connection, USB connection, firewire connection, or other wired connection.

As shown in FIG. 6, charging device 120 can comprise an internal modem coupled to either a public telephone network 612 or a private telephone network 614. File server 130 in this circumstance is coupled to a modem bank 602 of one or more modems, which establishes a communications link with the charging device 120 when an appropriate number is dialed. The communications between the charging device 120 and the file server 130 can be any Internet protocol such as point-to-point protocol (PPP). Additionally, many cellular telephones are equipped with a data port, which can be coupled to the modem of a computer. If cellular telephone 118 is so equipped and the charging device 120 comprises a modem, the charging device 120 uses the cellular telephone 118 to communicate with the file server's modems via a wireless telephone connection 610.

Cellular telephone 118 can communicate with charging device 120 in a variety of methods. In one embodiment, charging device 120 can be designed with a charger built in the form of a cradle whereby a cellular telephone 118 can be physically connected to the charging device 120 through contact points or integrated connector when the cellular telephone 118 rests in the cradle.

In another embodiment, the connection 632 is made with a cable used for charging the cellular telephone and transferring data to and from the cellular telephone through its data port. This cable can be attached to the cellular telephone 118 and charging device 120 thereby allowing the two components to communicate. The cable may be in the form of a universal serial bus (USB) or firewire cable or other data transfer cable. In other embodiments, cellular telephone 118 and charging device 120 may be equipped with local wireless capabilities such as cellular/PCS or Wi/Fi, Bluetooth or 802.11 wireless LAN. In such a case, charging device 120 can communicate to cellular telephone 118 through such an interface.

Optionally, charging device 120 can be integrated with additional peripheral devices such as action causing buttons 640 or a credit card reader 624. The action causing buttons 640 can be programmed to connect to the file server 130 upon activation to initiate the download of programmable information or compare the current cellular telephone settings with the stored programmable information. The credit card reader 624 can read credit cards to transmit the user's credit card information to the file server 130 for use in instances such as for prepaid cellular airtime. Credit card reader 624 can permit the user to purchase additional time by using a credit card rather than having to phone in a credit card number or pay for the time through a website.

Figure 7:
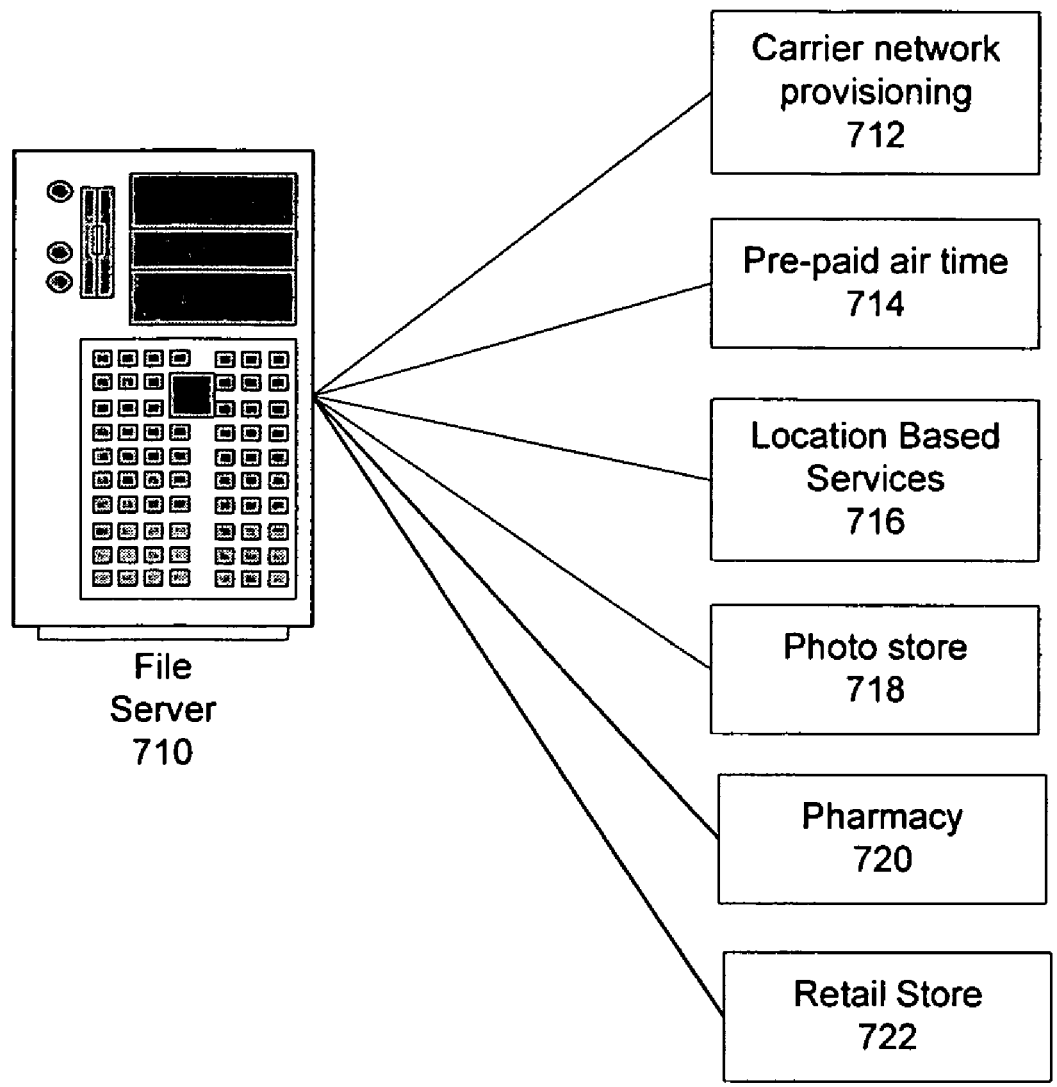
FIG. 7 shows an exemplary embodiment of a file server.

FIG. 7 illustrates exemplary services to which the file server 130 can be connected. The file server 130 can be coupled to a carrier network's provisioning service 712, whereby the cellular telephone 118 can be initially provisioned, or whereby the carrier or preferred roaming list itself can be changed. Additionally, cellular service features can be changed. For example, the user may no longer desire call waiting and can disable the call waiting feature by accessing the databases on the file server 130.

File server 130 can also be coupled to a prepaid airtime service 714, where the amount of remaining time can be programmed into or delivered to cellular telephone 118. The user can purchase additional time either through the web interface, the IVR system, a customer service representative, or by using the credit card slot 624 on an appropriately equipped charging device 120.

File server 130 can also be coupled to location-based services 716. For example, if a user travels to another location, the charging device 120 can report its location either through the wireless carrier or by reporting its caller identification when communicating with file server 130. With the location known, the file server 130 can extract from the user profile the type of regional services of interest as supplied by location-based services 716. For example, for a business traveler traveling from Los Angeles to Minneapolis can plug in the charging device 120. The file server 130 recognizes the location of the charging device 120 as being in Minneapolis. The user profile stored in the file server contains a request for local restaurants. Upon charging the cellular telephone, the local restaurant phone numbers are downloaded onto the cellular telephone. Furthermore, a form of online coupon can be made available to the user by the file server 130.

File server 130 can also be coupled to a photo store 718. In one embodiment, charging device 120 is coupled to a digital camera or a camera equipped telephone. Photos from the cellular telephone or the camera are downloaded to file server. The photos may also be distributed to a website service that can post the photos in a virtual photo album. The photos may also be emailed to list of designated recipients. The photos may also be sent to a selected photo store 718 where they can be developed and picked up by the users at their convenience.

File server 130 can also be coupled to a pharmacy 720. In one embodiment, charging device 120 is designed to be equipped with a scanner. This scanner employs a bar code or radio frequency identification (RFID) technology. The user scans a prescription, where charging device 120 submits this request to file server 130. File server 130 in turn delivers the request to the pharmacy 720 where the prescription is filled and the user can pick up his medication at his convenience.

File server 130 can also be coupled to a retail store 722. A user can purchase a cellular telephone from retail store 722 where retail store 722 directs file server 130 to provision the cellular telephone. In addition, a user can purchase prepaid cellular airtime at retail store 722 where retail store 722 records the additional cellular airtime through file server 130. Additional services can be purchase through retail store 722, transferred to file server 130 and downloaded to charging device 120.

Figure 8:
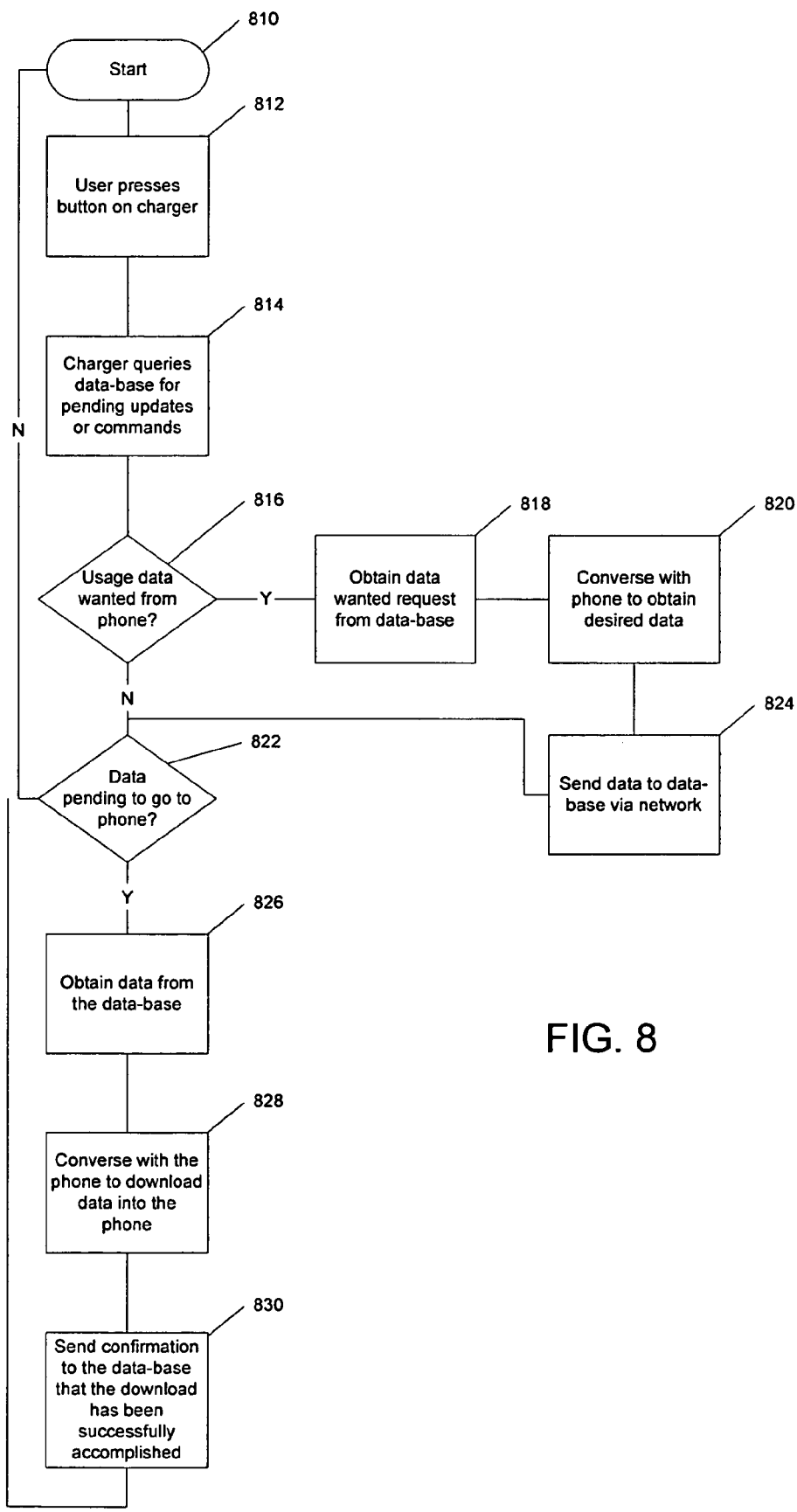
FIG. 8 is a flowchart that illustrates an example method by which the charging device operates to program settings within a cellular telephone.

FIG. 8 is a flowchart illustrating an example method for programming a cellular telephone in accordance with one embodiment of the systems and methods described herein.

In step 810, the charging device 120 is idle awaiting input from the user. In step 812, the user initiates an action. The user can initiate an action by pressing a button on the charging device 120 or by placing the cellular telephone in a cradle or otherwise attaching the cellular telephone 118 to the charging device 120. In step 814, charging device 120 queries file server 130 for any pending updates or commands to the cellular telephone.

In an alternate embodiment, the inquiry need not take place when the user initiates an action. At a predetermined time, charging device 120, independent of the user, could poll file server 130 for any pending updates or commands.

In step 816, charging device 120 determines whether it requires any data from the cellular telephone, such as manually programmed telephone numbers or features. If so, in step 818, the charging device 120 queries the file server 130 to determine what information is required from the cellular telephone 118 and, in step 820, it obtains that information from the cellular telephone 118. In step 824, the charging device 120 sends the data to file server 130 through, e.g., one of the communications methods mentioned in FIG. 6. The data retrieved may include names and telephone numbers of persons added manually or by some other process, numbers called, calls received, calls missed, text messages stored, other supported set-up information, and other information the manufacturer supports through the connection method.

In step 822, charging device 120 can be configured to determine whether there is any data that needs to be transferred to the cellular telephone. If not, charging device 120 can return to step 810, where it awaits the next action to be initiated. Otherwise, the charging device 120 can obtain the data from the database interfaced with the file server 130 in step 826. In step 828, the charging device 120 can be configured to download the data to the cellular telephone. In step 830, charging device 120 can send a confirmation back to file server 130.

Figure 9:
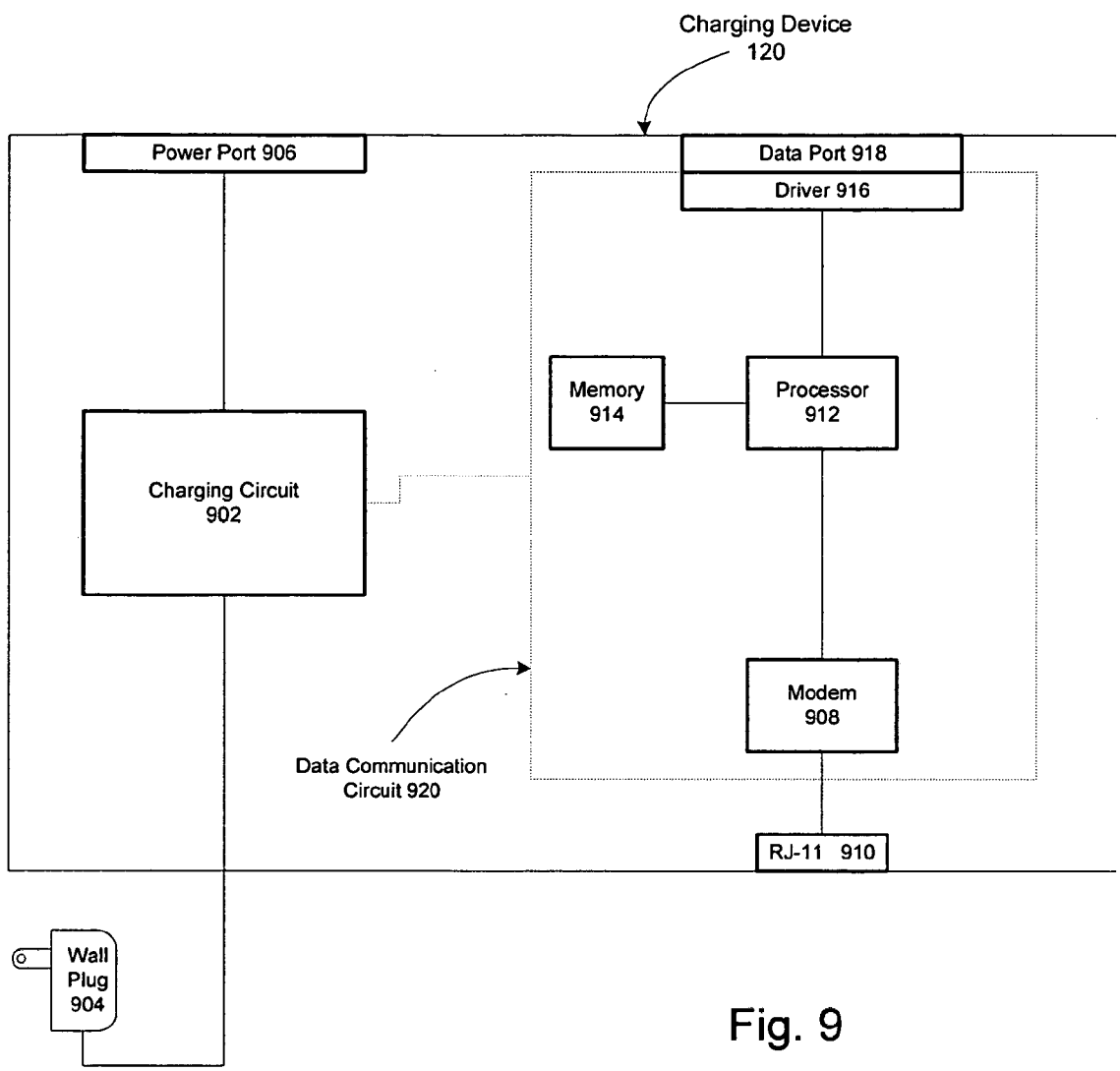
FIG. 9 is an exemplary schematic of a charging device configured to implement the method of FIG. 8.

FIG. 9 shows a schematic of a charging device 120 configured in accordance with the systems and methods described herein. The charging device 120 can comprise a charging circuit 902 coupled to a wall plug 904. Alternatively, the charging circuit 902 can be coupled to a transformer, which can be built into wall plug 904 as shown in FIG. 9. The charging circuit 902 can also be coupled to a power port 906. The charging circuit 902 is configured to charge the cellular telephone when the cellular telephone is coupled to power port 906.

The charging device 120 can further include a data communication circuit 920 that can house a driver 916, a processor 912, memory 914, and a modem 908. The modem 908 can be coupled to a telephone jack 910 such as a Registered Jack-11 (RJ-11) jack, which can be connected to a standard telephone line. The modem 908 can be coupled to a processor 912. The processor can be coupled to memory 914 and to a driver 916. Driver 916 is coupled to a data port 918, which is used to communicate to the data port of a cellular telephone. When the cellular telephone 118 is coupled to the charging device 120, power port 906 is coupled to the cellular telephone's power port, and data port 918 is coupled to the cellular telephone's data port. Furthermore, in one embodiment, the charging circuit 902 can be tapped to power the data communication circuit 920. Power port 906 and data port 918 can be physical contacts within a cradle, or they can be presented in the form of a jack whereby a custom cable can be attached in order to couple the device to the cellular telephone. Processor 912 can be a central processing unit (CPU) or other logic circuits depending on the complexity of the functions the charging device 120 is designed to perform. Memory 914 can be random access memory (RAM) or it can be some sort of non-volatile memory such as an electronically erasable programmable read only memory (EEPROM), flash memory, or nonvolatile random access memory (NVRAM).

In one embodiment, the device can also be used as a backup device. For example, the charging device 120 can constantly mirror the cellular telephone's 118 programmable characteristics in the charging device's 120 local memory even when the device is not in communication with the file server 130. Thus, if the cellular telephone's programmable characteristics are lost, the charging device 120 can be used to restore the settings.

The driver 916, which governs how the processor communicates with the cellular telephone, can be implemented with various software development kits (SDKs) available in the marketplace offered by the manufactures. For example, Nokia offers a variety of SDKs for interfacing different cellular telephone models into a variety of platforms. For example, the Nokia 3300 SDK is available for programming the 3300 cellular telephone. The Nokia 9200 Communicator series is available for programming cellular telephones in the 9200 series. Furthermore, Motorola offers a variety of development kits, tools and guides under their Motocoder™ resources.

In another embodiment, where the charging device 120 operates in a completely wireless mode, that is the charging device 120 uses the cellular telephone 118 to call file server 130, the charging device 120 may not include an RJ-11 telephone jack and can further include a car adapter to connect to the charging circuit 902.

In another embodiment, the data communication circuit 920 can be in a separate physical unit, external from the charging circuit 902. The external unit of the data communication circuit 920 can further comprise data port 906 and telephone jack 910. The data communication circuit 920 can be coupled to the charging circuit 902 through an external cable. Furthermore, the external unit of the data communication circuit 920 can further comprise power port 906.

Figure 10:
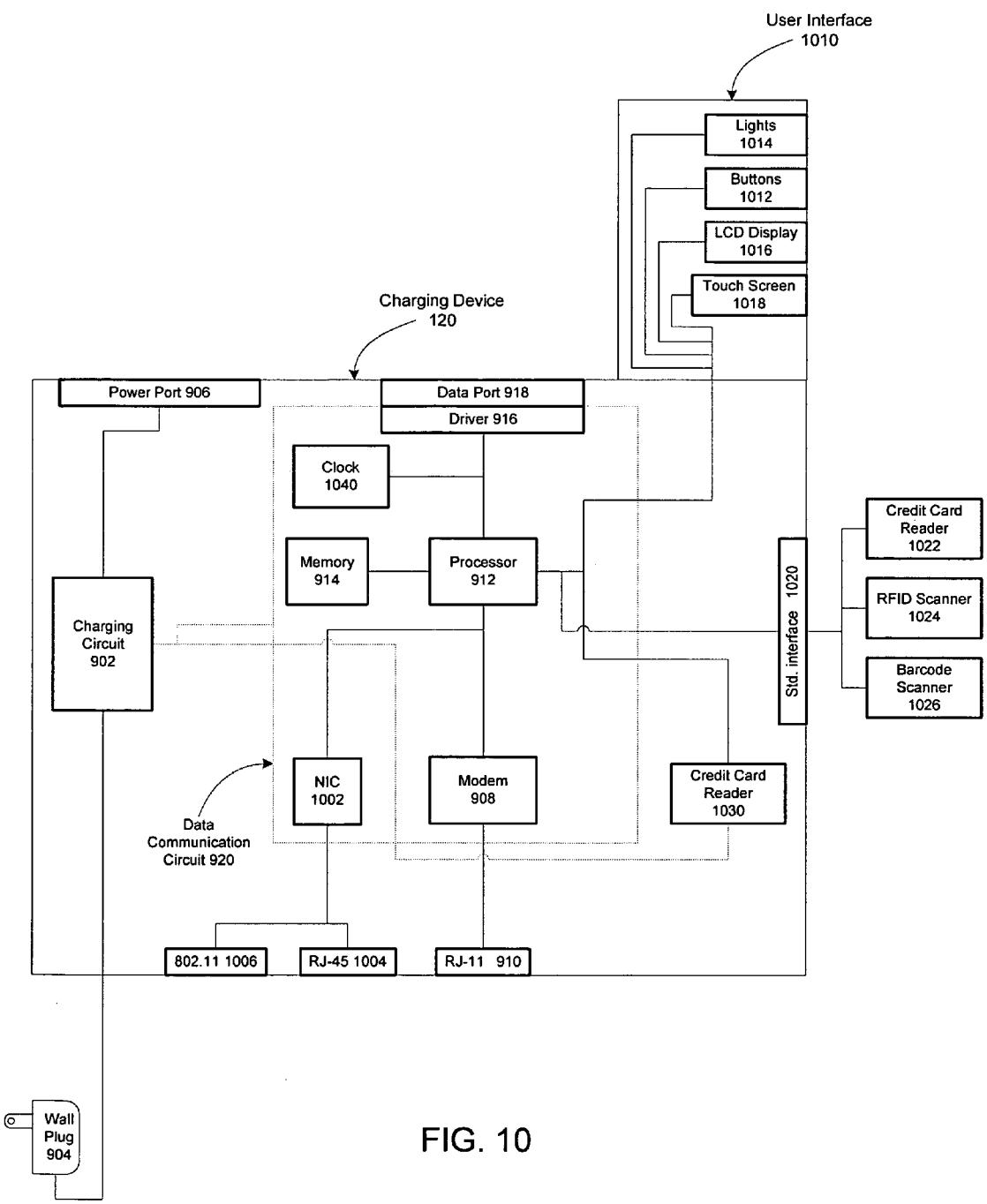
FIG. 10 shows an exemplary schematic of a charging device having additional interfaces and features including a user interface, a standard interface and a network card.

FIG. 10 depicts another schematic of the charging device 120. The charging device 120 can comprise a data communication circuit housing a communication port. A communication port can include a modem 908 coupled to a RJ-11 jack 910 through which the cellular telephone 118 and/or charging device 120 can establish a two-way communication link with the file server 130. In another embodiment, a communication port can include a network interface (NIC) 1002 coupled to an Ethernet port 1004, such as an RJ-45, or to a wireless 802.11 interface 1006 which the cellular telephone 118 and/or charging device 120 can establish a two-way communication link with the file server 130. The file server 130 can be coupled to the Internet or a private network, e.g. a private company or government local area network or wide area network, or a combination of public and private networks. In either embodiment, the charging device 120 can simply act as a conduit to communicate information and data from the file server 130 to the cellular telephone 118 and from the cellular telephone 118 to the file server 130 in a bi-directional manner. Alternatively, the charger 120 can maintain local intelligence and store in memory 914 information and data received from the file server 130 and forward that information to the cellular telephone 118 upon connection of cellular telephone 118 to the charger device 120. The information and data stored in the memory 914 can then be compared to that on the file server 130 in the case of further transmissions and communications with the file server 130. Additionally, information entered into the memory of cellular telephone 118 can be transmitted to the file server 130 through the data communication circuit of charging device 120.

The charging device 120 can further comprise a user interface 1010 which can house lights 1014, buttons 1012, a liquid crystal display (LCD) 1016, and/or a touch screen 1018. Additionally, the charging device 120 can comprise an standard interface 1020 such as USB, Firewire, or Recommended Standard 232 (RS-232) serial for coupling additional input/output devices such as a bar code scanner 1026, an RFID scanner 1024, and a credit card reader 1022.

Additionally, the charging device 120 can comprise a clock circuit 1012, which can be programmed and synchronized with data transmitted from the file server 130 via the Internet, to actively alert the user that the cellular telephone requires charging or that charging is complete. In one embodiment, the device can issue a warning such as a blinking light 1014 to indicate that the cellular telephone is in need of charging. The processor 912 can interact with the charging circuit 902 to determine whether the cellular telephone was fully charged upon the last charging session to give a more accurate estimate of battery life. Alternatively, the user can access a database within the file server 130 to input a predetermined time of day to alert the user to re-charge the cellular telephone and a predetermined time of day to alert the user to remove the cellular telephone from the charger. Hence, the predetermined times of day can then be downloaded into the memory 914 of the charging device 120 via the Internet connection and the processor 912 can be programmed to alert a user at a predetermined time, e.g. 11 p.m., each day to charge the cellular telephone. The predetermined times can be stored in memory 914 and can be replaced on subsequent downloads with an updated predetermined time. A user can store multiple schedules of programmed alerts in memory 914 to which the user can select. For example, the user can program a weekend schedule and a weekday schedule of alerts. In another embodiment, user interface 1010 can be configured to display the current time. In another embodiment, the charging circuit 902 can be configured to indicate to the user through a visual alert and/or an audible tone at a provided time a reminder to charge the cellular telephone or an indicator that the cellular telephone is fully charged, thus providing alternative alerts in the alarming feature. The user can select from an array of audible tones including traditional alarm rings, beeps, various ring tones, and/or voice alerts such as "Please charge your cellular telephone" or "Your cellular telephone is charged." Voice alerts can be prerecorded, generic voices or a user can record a personalized message. A user can record his or her voice alert using a record feature on user interface 1010 or by recording a voice alert through a computer coupled to a database of file server 130, which can later be downloaded into the memory 914 of the charging device 120 via the Internet connection. These audible tones and/or alerts can be simultaneously displayed with corresponding visual alerts on user interface 1010 via LCD display 1016, touch screen 1018, or blinking lights 1014. Visual alerts displayed on LCD display 1016, or touch screen 1018 can be similar to voice alerts heard such as "Please charge your cellular telephone" or "Your cellular telephone is charged."

In a further embodiment, a simplified charging device 120 can include a clock circuit 1012 coupled to the processor 912 that can interact with the charging circuit 912 to provide the alarming feature as discussed above. In this simplified charging device 120, power port 906 and/or data port 918 can detect the presence of a cellular telephone either in the cradle or connected via a custom cable and can initiate the user-programmable alarming feature. The user can program the alarming feature to alert the user at a predetermined time each day that the cellular telephone requires charging, to alert the user that the cellular telephone requires charging as calculated from the duration of time between charges, to alert the user after the cellular telephone has charged for a predetermined period of time, and/or to alert the user that the cellular telephone is fully charged. The user can further deactivate the alarming feature or manually disengage the cellular telephone for required use during a charge. In one embodiment, a user can locally program the alarming feature using buttons 1012 on user interface 1010.

Figure 11:
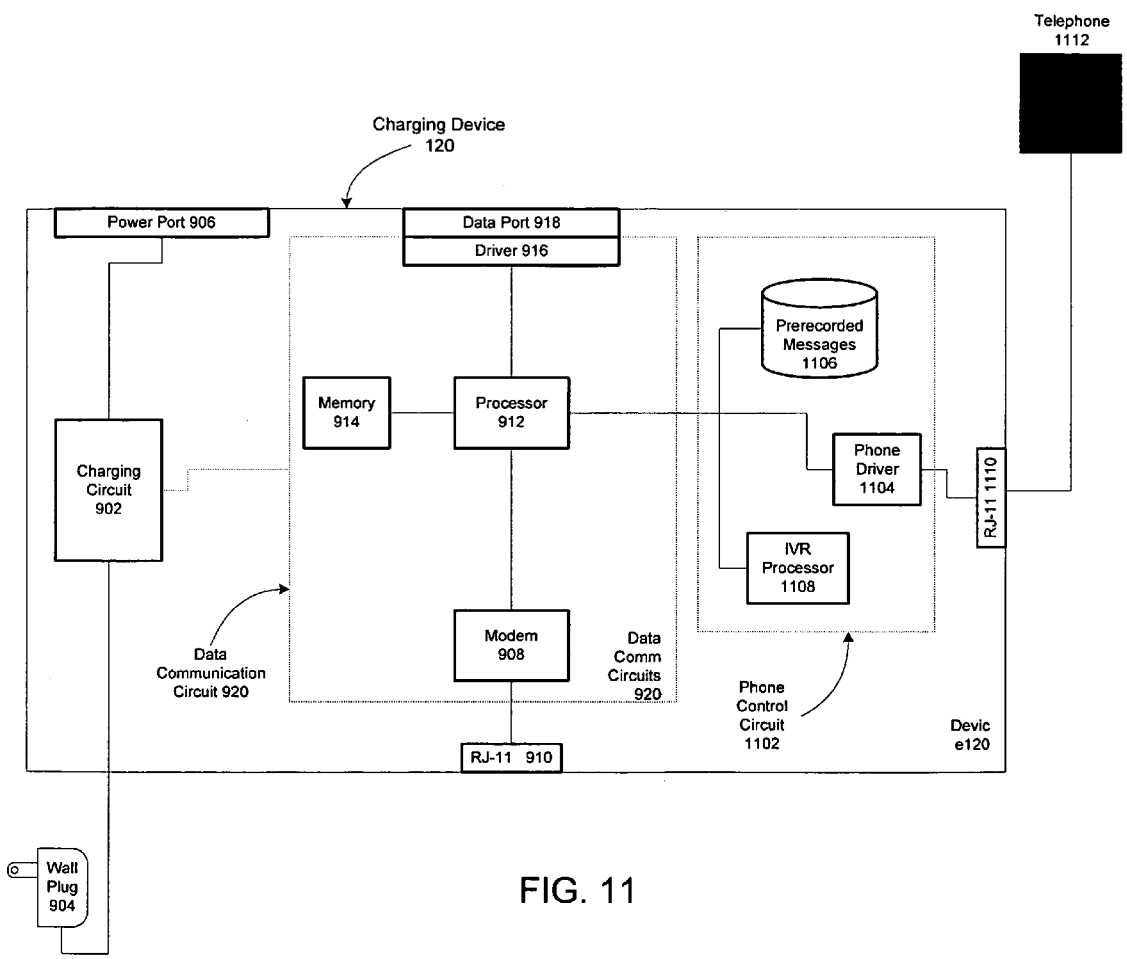
FIG. 11 shows an exemplary embodiment of a charging device having a circuit for coupling to a conventional telephone.

In another embodiment, depicted in FIG. 11, the charging device 120 can further comprise a telephone control circuit 1102 to connect the charging device 120 through a standard connector 1110 such as an RJ-11 to a conventional telephone 1112. The alarming function discussed above can alternatively indicate the user via telephone control circuit 1102, which can ring the conventional telephone 1112 rather than blink a light as an indicator that action is required. In a further embodiment, a telephone control circuit 1102 can be programmed with prerecorded messages 1106 so that when the user answers the conventional telephone 1112, a detailed message directs the user as to the course of action to be taken. In some situations, this is preferable to a cryptic combination of warning lights. In another embodiment, the telephone control circuit could comprise an IVR processor 1108 which can allow the users to interact with the device through DTMF tones on the conventional telephone 1112. In still another embodiment, the IVR processor 1108 can be configured to respond to simple voice commands.

In one embodiment, the charging device 120 can be connected in series with a conventional telephone 1112 and an internal or external answering device with a message light. The conventional telephone 1112 may be used for communicating with the file server 130 through control features using DTMF. For example, a conventional telephone 1112 incorporated with the charging device 120 can manage through the file server 130 programmable speed dial buttons on both the conventional telephone 1112 and the cellular telephone 118. Furthermore, if a conventional telephone 1112 is coupled to the charging device 120, through telephone jack 1110, simple voice commands can be interpreted by the IVR processor 1108 which can be used to manage simple operations such as using a verbal command to dial a phone number. For example, after dialing the file server 130 with the conventional telephone 1112, a user could program a cellular telephone 118 using local voice prompts. In a further example, after dialing a called party on either the conventional telephone 1112 or the cellular telephone 118, the user can speak the name of the called party if the number is not currently stored in the memory of the cellular telephone 118. The spoken name of the called party with the corresponding telephone number dialed can be communicated to the file server 130 that can manage the new setting. The user can then simply speak the called party's name to place a subsequent call to that party without entering the corresponding telephone number. Additionally, messages stored on the answering machine can be transferred to the file server 130 for remote access by the user.

Figure 12:
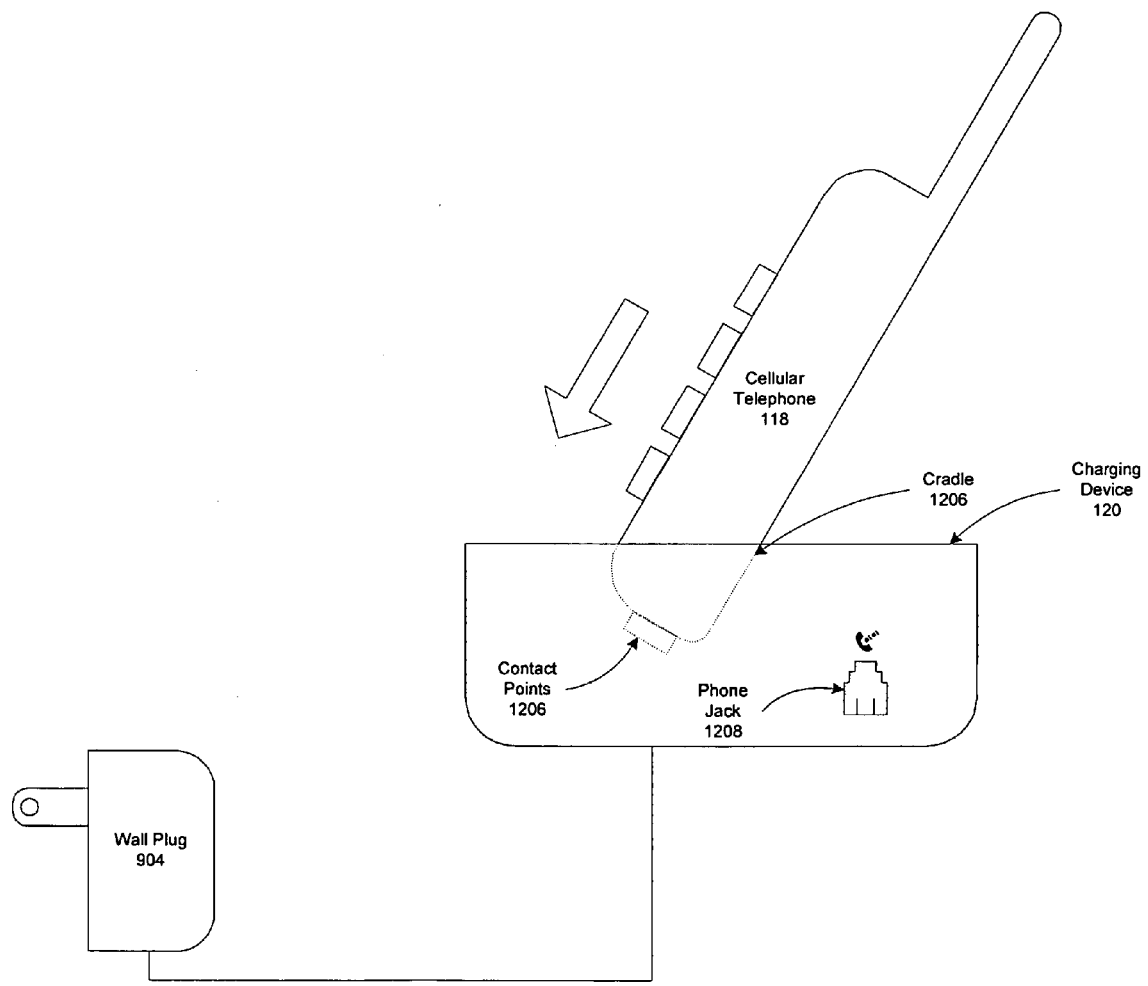
FIG. 12 shows an exemplary embodiment of a charging device having a cradle for coupling to the cellular telephone.

FIG. 12 illustrates an exemplary schematic of a charging device 120 in which the cellular telephone 118 sits in a cradle 1204 and is coupled to the charging device 120 through contact points 1206. The contact points 1206 can transfer a charge to the cellular telephone 118 and can transmit information between the cellular telephone 118 and the charging device 120. The charging device 120 can also include a telephone jack 1208 for communicating to the file server 130 and a wall plug 904 to power the charging device 120. In one embodiment, the logic required to initialize data transfers and charging can reside inside the charging device 120.

Figure 13:
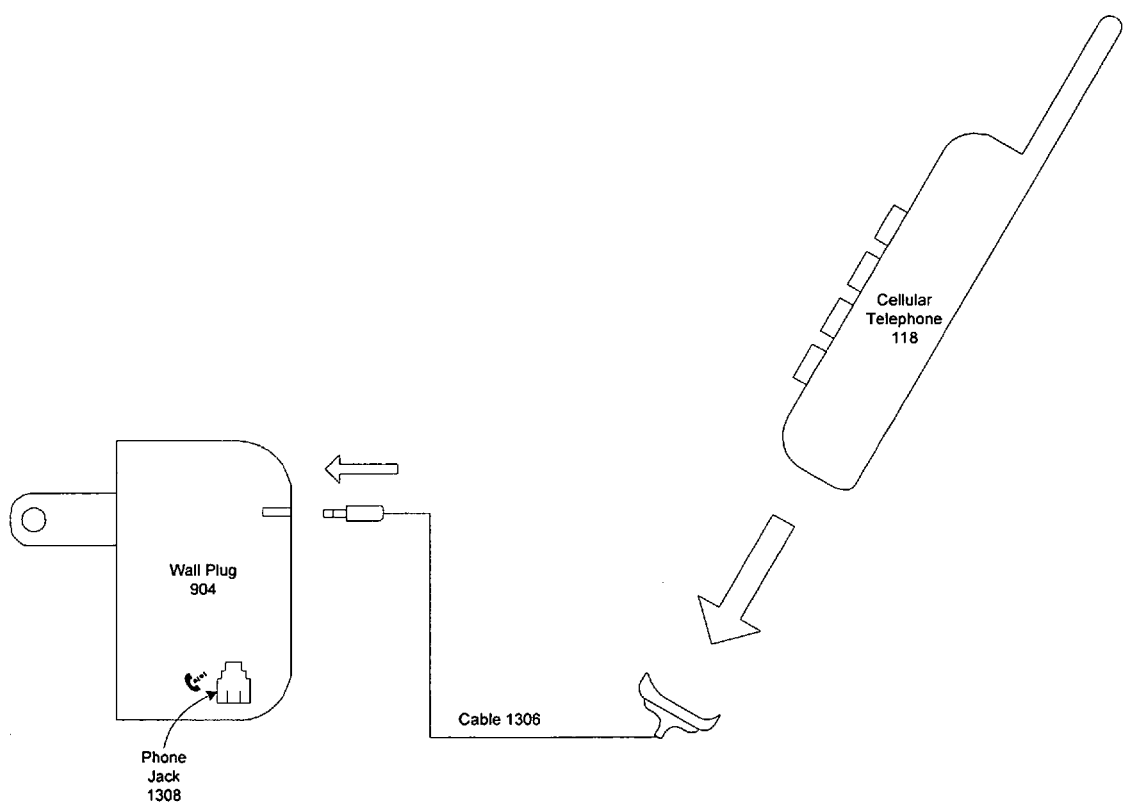
FIG. 13 shows an exemplary embodiment of a charging device having a cable and jack for coupling to the cellular telephone.

FIG. 13 illustrates another exemplary schematic for the charging device where the cellular telephone 118 can be coupled to the wall plug 904 via cable 1306. The wall plug 904 can also contain an internet connection through a telephone jack 1308 provided for communicating to a file server 130. The cable 1306 and wall plug 904 can be built into a single, integrated unit with the transformer unit, which is plugged into the wall.

Figure 14:
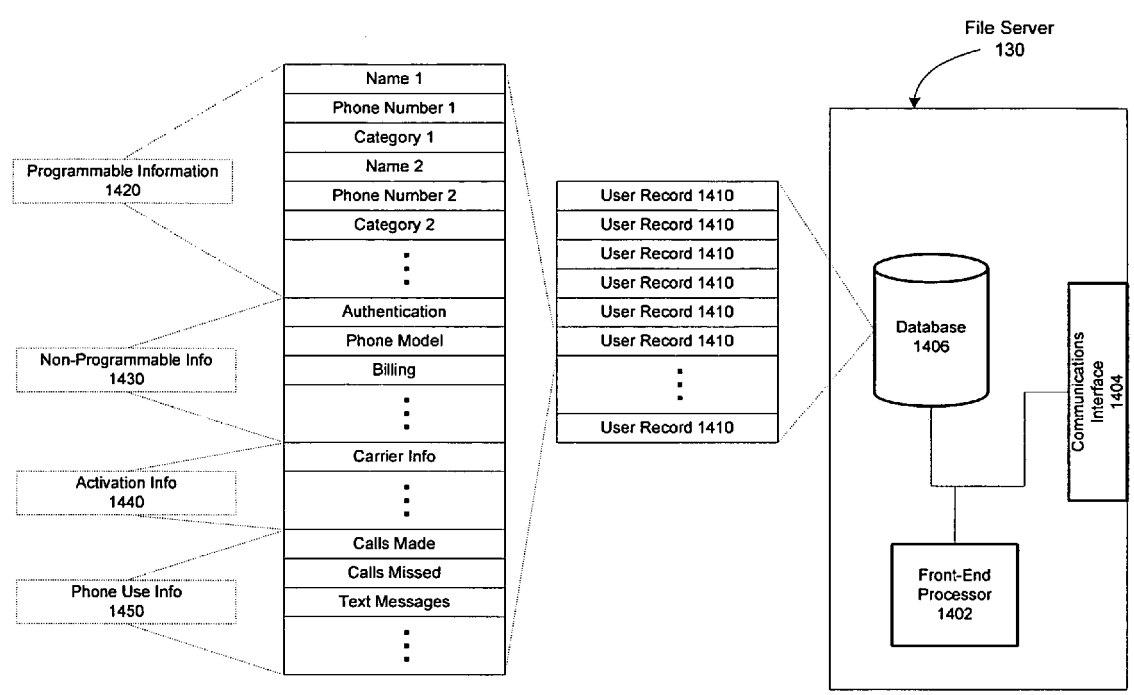
FIG. 14 shows an exemplary embodiment of the file server and the records stored on the file server.

FIG. 14 depicts an exemplary embodiment of the file server 130 comprising a front-end processor 1402, a communications interface 1404, and a database 1406. This embodiment can resemble a standard database server available in the marketplace. Database 1406 can store a user record 1410 for each user. Each record can comprise a plurality of entries. The entries can include programmable information 1420, such as the names, telephone numbers and categories of individuals, ring tones, and volume levels. The entries can also include non-programmable information 1430 such as comments for each name, authentication information for the account, the make and model of the cellular telephone currently used, and billing information The entries can also include activation information 1440 such as provisioning information used to select a carrier or activate a new cellular telephone. The record can comprise entries associated with telephone use information 1450 such as the numbers called, the number of received or missed calls, text messages store, and other information that can be generated at the cellular telephone.

Some cellular telephones are also designed to maintain sub-categories or multiple numbers for each person or organization entered into the cellular telephone. Depending on the configuration, the file server can adapt these values for cellular telephones not capable of support such features. For example, if Joe Smith has a cellular telephone number, a home number, and a work number. The file server can program a cellular telephone, which does not support multiple telephone numbers with the labels "Joe Smith (C)," "Joe Smith (H)," and "Joe Smith (W)".

In another scenario, the user may only desire to download some of the entries. For example, the record in the database applies to multiple cellular telephones within the same household. Certain personality traits may only be desired for certain cellular telephones in the household. Another situation may arise when information may be time sensitive or confidential and the user may only want those entries resident in the cellular telephone for a fixed period of time.

while embodiments and implementations of the invention have been shown and described, it should be apparent that many more embodiments and implementations are within the scope of the invention. Accordingly, the invention is not to be restricted, except in light of the claims and their equivalents.

What is claimed:

1. A method of providing a communications service to a user of a portable communications device, the method comprising:

storing entries in a network device, one of said entries including provisioning information used to activate the portable communications device; and during a period of time when said portable communications device is connected to a charging device:

downloading to said portable communications device, said provisioning information used to activate the portable communications device.

2. The method of claim 1, wherein downloading to said portable communications device said provisioning information includes:

downloading information used to initialize said portable communications device to enable use of said portable communications device by said user.

3. The method of claim 2, wherein said portable communications device is a cellular telephone.

4. The method of claim 3, wherein said network device is a network server; and wherein downloading to said portable communications device said provisioning information includes:

communicating said provisioning information from the network device to the charging device via the Internet.

5. The method of claim 3, wherein said network device is a network server, the method further comprising, prior to downloading said provisioning information:

operating the network server to receive user specific information intended to be downloaded to said portable communications device; and downloading to said portable communications device, user specific information received prior to activation of said portable communications device.

6. The method of claim 5, wherein said network server receives said user specific information to be downloaded via the Internet; and wherein said user specific information includes a set of telephone numbers corresponding to the user to be used for dialing.

7. The method of claim 5, wherein said user specific information received prior to activation of said portable communications device is received from the user of said portable communications device.

8. The method of claim 5, wherein said at user specific information received via the Internet prior to activation of said portable communications device is received from a third party manager of the portable communications device who is different from the user of said portable communications device.

9. The method of claim 5, wherein said user specific information received by the network server includes information used to identify the communications device into which received information is to be downloaded.

10. A method of providing a communications service to a user of a portable communications device, the method comprising:

storing service information in a network device, said service information to be used in providing a communication service to the user of the portable communications device, said portable communications device being a cellular telephone, said network device being a network server;

prior to downloading activation information to said portable communication device, operating the network server to receive information intended to be downloaded to said communications device;

wherein said information received by the network server includes information used to identify the communications device into which received information is to be downloaded;

wherein said information used to identify the communications device includes a number identifying the particular communications device, said number being a number which is on the portable communications device or packaging included with the portable communications device; and during a period of time when said portable communications device is connected to said charging device:

downloading to said portable communications device, through a connection between said charging device and said portable communications device, activation information supplied by said network device, said activation information being used in activating a feature of said portable communications device, said activation information including some of said stored service information.

11. A method of providing a communications service to a user of a portable communications device, the method comprising:

operating the network server to receive information intended to be downloaded to said communications device;

storing service information in a network device, said network device being a network server, said service information to be used in providing a communication service to the user of the portable communications device; and during a period of time when said portable communications device is connected to said charging device:

downloading to said portable communications device, through a connection between said charging device and said portable communications device, activation information supplied by said network device, said activation information being used in activating a feature of said portable communications device; and wherein said information received by the network server includes names and telephone numbers to be downloaded to the portable communications device.

12. The method of claim 5, further comprising:

after activation of said communications device, activating a dormant feature of said communications device, said step of activating a dormant feature including communicating additional information through said charging device to said portable communications device.

13. A method of providing a communications service to a user of a portable communications device, the method comprising:

storing service information in a network device, said service information to be used in providing a communication service to the user of the portable communications device;

during a period of time when said portable communications device is connected to said charging device:

downloading to said portable communications device, through a connection between said charging device and said portable communications device, activation information supplied by said network device, said activation information being used in activating a feature of said portable communications device; and after activation of said portable communications device, activating a dormant feature of said portable communications device, said step of activating a dormant feature including communicating additional information through said charging device to said portable communications device;

wherein said portable communications device is a cellular telephone; and wherein said dormant feature includes one of an instant messaging feature, web browsing feature, video streaming feature, and a video gaming feature.

14. The method of claim 5, further comprising:

prior to downloading to said portable communications device, operating the charging device to query said network device for a pending update for said portable communications device and a command intended for said portable communications device.

15. The method of claim 14, wherein said query is initiated in response to pressing a button on the charging device.

16. The method of claim 14, wherein said query is initiated in response placing of the cellular telephone in a cradle of the charging device.

17. The method of claim 14, wherein said query is initiated by said charging device at a predetermined time independent of the user.

18. The method of claim 5, further comprising:

programming said portable charging device to generate an alarm at a predetermined time to alert a user of the portable communications device to charge said telephone.

19. The method of claim 18, wherein programming said charging device includes storing in said charging device alarm time information communicated via the Internet.

20. The method of claim 14, wherein said portable communications device is a cellular telephone;

wherein said network device stores a record in a database that applies to multiple cellular telephones within the same household; and wherein only a subset of the information stored for the multiple cellular telephones for the household to which said cellular telephone corresponds is relevant to said cellular telephone.

21. The method of claim 14, wherein said query is initiated by said charging device placing a call used to connect to said network device.

22. The method of claim 14, further comprising:

operating the charging device to mirror programmable setting information stored a memory of the portable communications device; and operating the charging device to restore the programmable information to communications device after said communications device loses the settings.

23. The method of claim 5, wherein said portable communications device is a cell phone; and wherein downloading to said portable communications device includes downloading information used to initialize and activate an un-programmed cellular telephone.

24. A method of operating a charging device in a system including a portable communications device which can be charged by said charging device, the method comprising:

receiving provisioning information from a network device, said provisioning information being used to activate the portable communications device; and during a period of time when said portable communications device is connected to said charging device:

downloading to said portable communications device, through a connection between said charging device and said portable communications device, said provisioning information used to activate the portable communications device.

25. The method of claim 24, wherein downloading said provisioning information includes:
   downloading information used to initialize said portable communications device to enable use of said portable communications device by said user.

26. The method of claim 25, wherein said portable communications device is a cellular telephone.

27. The method of claim 26, wherein said network device is a network server; and
   wherein downloading said provisioning information includes:
   receiving said provisioning information from the network device via the Internet.

28. The method of claim 26, wherein said network device is a network server; and
   wherein said provisioning information downloaded to said communications device is received by said network server prior to activation of said portable communications device.

29. The method of claim 28, wherein said network server receives said provisioning information to be downloaded via the Internet.

30. The method of claim 28, wherein information is received prior to activation of said portable communications device by said network server from the user of said portable communications device.

31. The method of claim 28, further comprising:
   prior to downloading to said portable communications device, querying said network device for a pending update for said portable communications device and a command intended for said portable communications device.

32. The method of claim 31, wherein said querying is initiated in response to pressing a button on mounted on said charging device.

33. The method of claim 31, wherein said querying is initiated in response detecting placement of the cellular telephone in a cradle of the charging device.

34. The method of claim 31, wherein said querying is initiated at a predetermined time independent of the user.

35. The method of claim 28, further comprising:
   storing in memory in said charging device program information used to generate an alarm at a predetermined time to alert a user of the portable communications device to charge said telephone.

36. The method of claim 35, wherein storing program information includes storing in said charging device alarm time information communicated via the Internet.

37. The method of claim 31,
   wherein said portable communications device is a cellular telephone;
   wherein said network device stores a record in a database that applies to multiple cellular telephones within the same household; and
   wherein only a subset of the information stored for the multiple cellular telephones for the household to which said cellular telephone corresponds is relevant to said cellular telephone.

38. The method of claim 31, wherein said querying is initiated by said charging device placing a call used to connect to said network device.

39. The method of claim 31, further comprising:
   mirroring in memory included in said charging device programmable setting information stored a memory of the portable communications device; and
   restoring the programmable information to a communications device after said communications device loses the settings.

40. The method of claim 28,
   wherein said portable communications device is an un-programmed cell phone; and
   wherein downloading to said portable communications device includes downloading information used to initialize and activate said un-programmed cellular telephone.

* * * * *